May 8, 1923.
J. M. DUNLEA
1,454,671
HEADLIGHT
Filed June 1, 1922
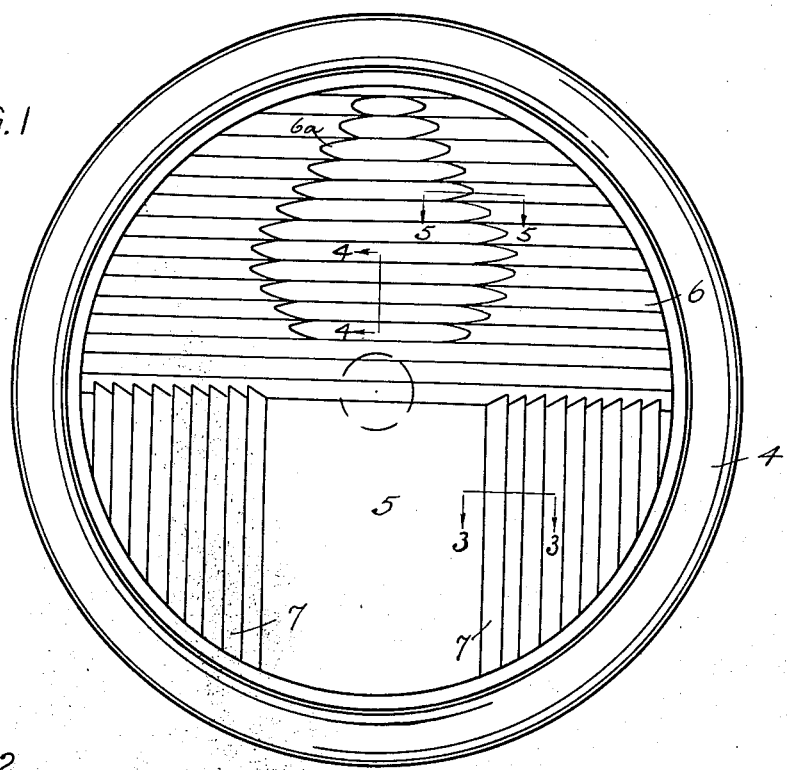
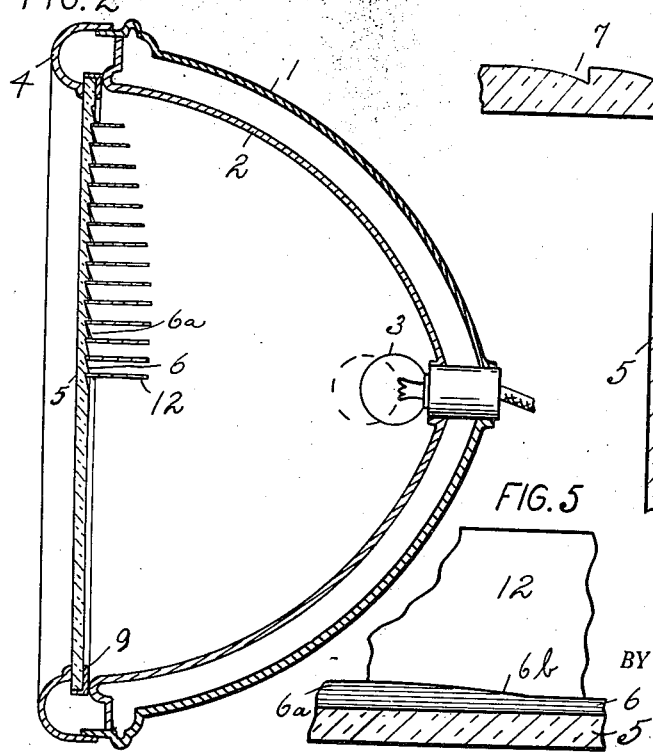
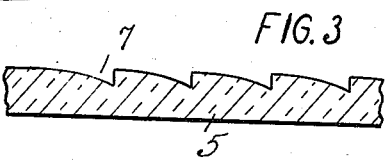
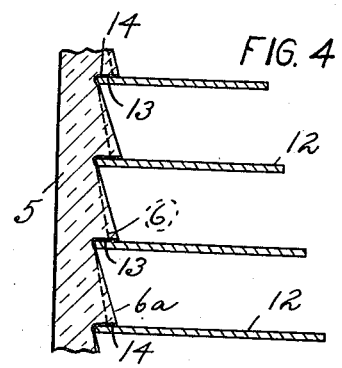
JOHN M. DUNLEA
INVENTOR.
BY R. W. Smith
ATTORNEY.

Patented May 8, 1923.

1,454,671

UNITED STATES PATENT OFFICE.

JOHN M. DUNLEA, OF LOS ANGELES, CALIFORNIA.

HEADLIGHT.

Application filed June 1, 1922. Serial No. 565,153.

*To all whom it may concern:*

Be it known that I, JOHN M. DUNLEA, a citizen of the United States, residing at Los Angeles, in the county of Los Angeles and State of California, have invented new and useful Improvements in Headlights, of which the following is a specification.

This invention relates to headlights particularly adapted for use upon automobiles and the like, and has for its object to prevent light being projected at such an inclination as to cause dangerous glare.

The invention contemplates an arrangement whereby the intensity of the light is not appreciably diminished, but the rays of light are so directed onto the road as to thoroughly illuminate the same, while limiting the upward and lateral divergence of the rays.

More specifically the invention provides for downward refraction of the light at the upper portion of the headlight, and lateral refraction of the light at the respective sides of the lower portion of the headlight toward the axis thereof, preferably with the source of light focussed with relation to the reflector of the headlight, so that the rays of the headlight are divergent.

Further objects of the invention will be readily understood from the following description of the accompanying drawings, in which, Fig. 1 is a front elevation of a headlight constructed in accordance with the invention.

Fig. 2 is a vertical section through the headlight.

Figs. 3, 4, and 5 are detail sections on the lines 3—3, 4—4, and 5—5 of Fig. 1.

The headlight includes a usual casing 1 carrying the reflector 2 and the electric lamp 3. The lamp is preferably shifted axially of the reflector from its normal position as shown in dotted lines in Fig. 2, and to a position where it is so focussed that the rays of light of the headlight are divergent.

The glass 5 of the headlight is held in position by a usual retaining ring 4, and the surface of the glass, in the present instance the side toward the lamp 3, is provided with prismatic surfaces, arranged for downward refraction of the light at the upper portion of the headlight, and lateral refraction of the light at the respective sides of the lower portion of the headlight toward the axis As an instance of this arrangement, prismatic surfaces are provided upon the glass above its center, and comprising a series of horizontally extending vertically spaced surfaces 6 outlined by grooves which have bases inclined upwardly and into the glass.

Similar surfaces 7 are also provided upon the glass at the respective side portions thereof below the center of the glass, and spaced apart at the vertical center of the glass. These surfaces are produced by a series of vertically extending grooves alongside one another, and having bases inclined toward the outer edge of the glass and into said glass, said bases of the grooves being preferably described by arcs of circles with the ends of said arcs toward the center of the glass substantially at a tangent to the plane of the glass.

By this arrangement it will be seen that the portion of the glass below its center and between the series of surfaces 7 is a plane surface.

The inclined surfaces 6 will cause downward refraction of the rays of light striking the same, and means are preferably provided for causing an increased downward angle of refraction at the vertical medial portion of the glass which is spaced above the center of the glass and below the periphery thereof.

For this purpose, the lower edges of the surfaces 6, at this portion of the glass, are extended outwardly so as to form an increased angle of inclination as shown at $6^a$. At the ends of these portions which are of greater angularity, the projected lower edges of said surfaces are curved so as to meet the lower edges of the main portions of surfaces 6, as clearly shown at $6^b$ in Fig. 5.

As shown in Fig. 1, the portions $6^a$ are preferably of varying length, with the greatest length upon the surface which is intermediate of the upper and lower limits of the portion of the glass having surfaces $6^a$, and said surfaces being of decreasing length from this intermediate surface, towards said limits of the portion of the glass having said surfaces 6.

A ring 9 is adapted to be received against the inner surface of glass 5 and over the peripheral edge thereof. Horizontal blades 12, cooperating with surfaces 6 and $6^a$ are carried by this ring. The front edges of the blades are adapted to seat in the grooves 13 formed at the junction of adjacent surfaces 6, and the blades extend rearwardly within the headlight.

The upper surfaces of the blades as thus described, are non-reflecting surfaces, and may be made light absorbing by a suitable coating, while the under surfaces of the blades are reflecting surfaces.

In practice, a light absorbing coating may be provided at the junction of the ends of blades 12 and grooves 13, as shown at 14, in order to prevent the leakage of light, if the blades do not seat snugly in said grooves.

The upwardly diverging rays will strike the reflecting surfaces of blades 12, and will thus be deflected downwardly before striking the glass. The rays passing through the glass at surfaces 6 will be refracted downwardly, and the rays striking surfaces 6ª, will be refracted downwardly to a greater extent, due to the increased inclination of said surfaces. The rays striking surfaces 6ᵇ, in addition to the downward refraction thereof, will also be refracted laterally toward the axis of the headlight, due to the curvature of said surfaces.

The rays below the center of the headlight will be downwardly and laterally diverging, and it is therefore not necessary to provide for downward refraction of these rays. The vertically medial portion of the lower part of the glass having no angularly disposed surfaces, will permit the straight projection of rays through the same, but the rays at this portion of the headlight have a lateral and downward divergence, so that a relatively dark spot would be formed in the pattern of light, directly in front of this portion of the headlight, as well as in front of the upper vertically medial portion of the headlight, if it were not for the aforementioned refracting surfaces 6ᵇ and the surfaces 7.

The surfaces 7, as well as the surfaces 6ᵇ, cause lateral refraction of the light striking the same toward the axis of the headlight, so as to project rays of light at what would otherwise be the said dark spot in the pattern of light, and to reduce the tendency to glare by laterally diverging rays.

It will thus be seen that I have provided a headlight arranged for divergence of the rays from the reflector 2, said headlight being also constructed for downward projection of the rays of light from the upper portion of the headlight; with said downward projection increased together with lateral refraction of the rays at the central portion of the upper half of the headlight, and the headlight also constructed for straight projection of the rays at the vertically medial portion of the lower part of the headlight, which rays are at such an angle as not to cause glare, together with lateral inward refraction of the rays at each side of the lower vertically medial portion of the light.

As a consequence, glare in front of the headlight and at the sides thereof is prevented, and at the same time the light is strengthened at the vertically medial portion of the pattern of light, where otherwise a relatively dark spot would be formed.

It will be apparent that various changes may be made in the construction as thus described, without departing from the spirit of the invention.

What is claimed is:

1. A headlight lens comprising a glass plate, a continuous series of horizontal, straight, parallel, wedge shaped prisms covering the upper half thereof, the thicker edge of each prism being continuous and directed downwardly, the angle of the central portion of certain of said prisms being more acute than that of the end portions of the same prisms and merging thereinto, plane parallel surfaces upon the two sides of the plate at the middle portion of the lower half thereof extending from the lowest horizontal prism to the lower edge of the plate, two series of vertical, straight, parallel, wedge shaped prisms extending from the lowest horizontal prism to the lower edge of the plate, said series of vertical prisms being separated by said plane surfaced portion, the thicker edges of the vertical prisms being directed toward the vertical diameter of the plate, and the surfaces of the vertical prisms being each formed upon the arc of a circle tangent to the plane of the plate at the base of the prism.

2. A headlight lens attachment comprising in combination a glass plate, a continuous series of horizontal, straight, parallel, wedge shaped prisms covering the upper half of the plate, the thicker edge of the prisms being continuous and directed downwardly, plane parallel surfaces upon the two sides of the plate at the middle portion of the lower half thereof extending from the lowest horizontal prisms to the lower edge of the plate, two series of vertical, straight, parallel, wedge shaped prisms extending from the lowest horizontal prisms to the lower edge of the plate, said series of vertical prisms being separated by said plane surfaced portion, the thicker edges of the vertical prisms being directed toward the vertical diameter of the plate, and a screen comprising a series of horizontal plates, the forward edges of the plates contacting with the bases of the horizontal prisms respectively.

3. A headlight lens comprising a glass plate, a continuous series of horizontal, straight, parallel, wedge shaped prisms covering the upper half thereof, the thicker edge of each prism being continuous and directed downwardly, the angle of the central portion of certain of said prisms being more acute than that of the end portions of the same prisms and merging thereinto, plane parallel surfaces upon the two sides of the plate at the middle portion of the lower half thereof extending from the lowest horizontal prism to the lower edge of the plate, two series of vertical, straight, parallel, wedge shaped prisms extending from the lowest horizontal prism to the lower edge of the plate said series of vertical prisms being separated by said plane surfaced portion, the thicker edges of the vertical prisms being directed toward the vertical diameter of the plate.

4. A headlight lens comprising a glass plate, a continuous series of horizontal, straight, parallel, wedge shaped prisms covering the upper half thereof the thicker edge of each prism being continuous and directed downwardly, plane parallel surfaces upon the two sides of the plate at the middle portion of the lower half thereof extending from the lowest horizontal prism to the lower edge of the plate, two series of vertical, straight, parallel, wedge shaped prisms extending from the lowest horizontal prism to the lower edge of the plate said series of vertical prisms being separated by said plane surfaced portion, the thicker edges of the vertical prisms being directed toward the vertical diameter of the plate, and the surfaces of the vertical prisms being each formed upon the arc of a circle tangent to the plane of the plate at the base of the prism.

In testimony whereof I have signed my name to this specification.

JOHN M. DUNLEA.